United States Patent Office 2,924,243
Patented Feb. 9, 1960

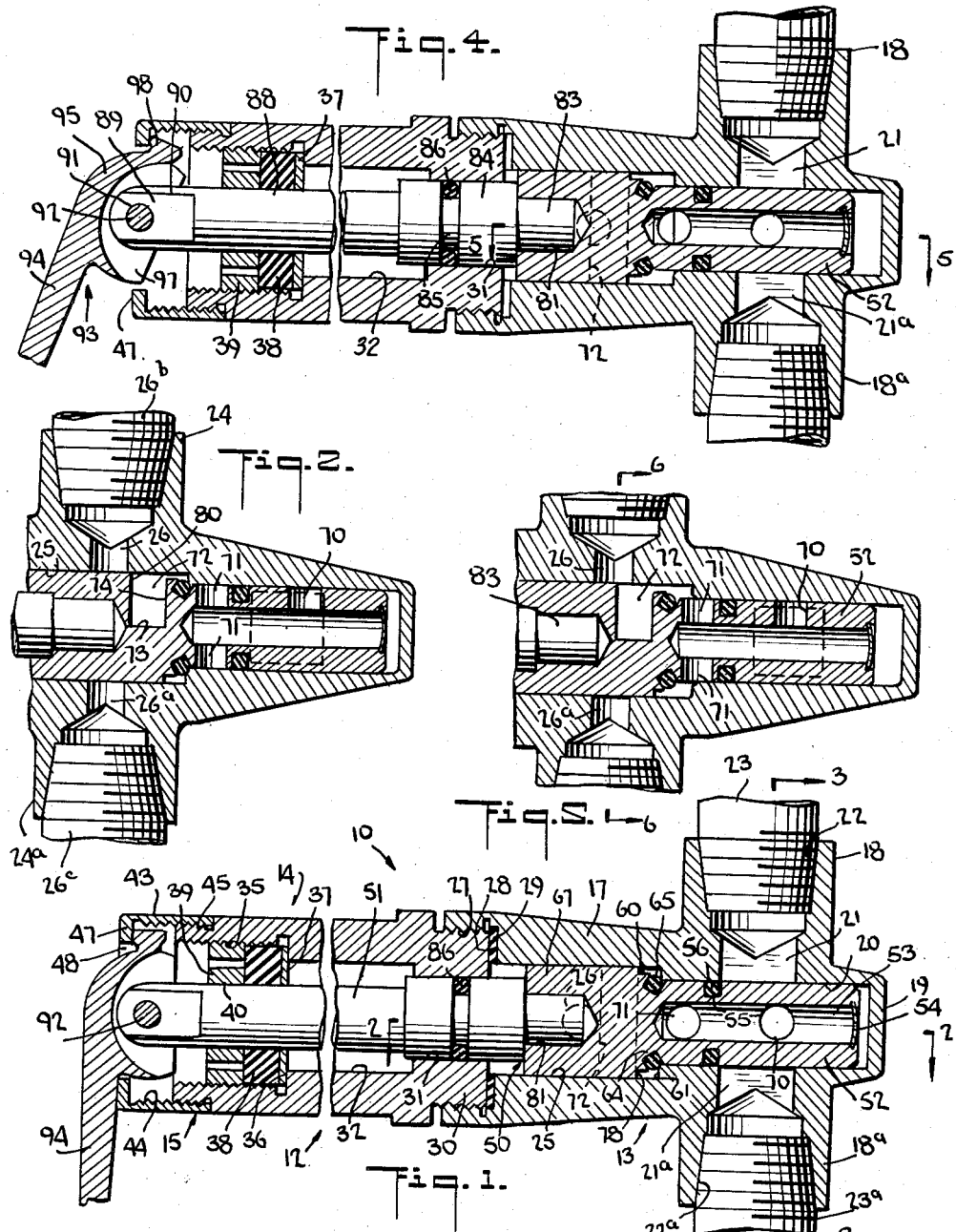

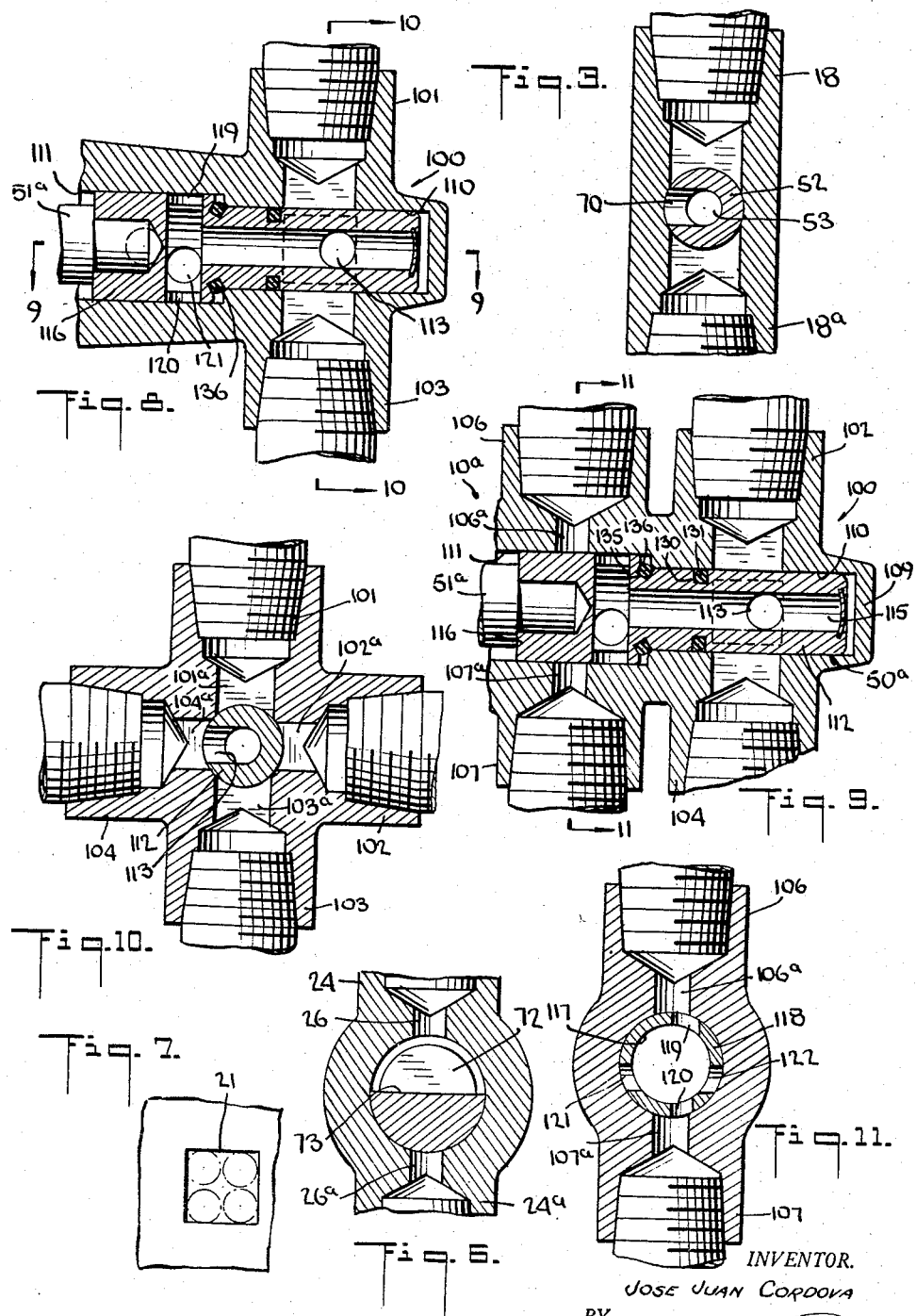

2,924,243

MULTIPLE MIXING AND DISTRIBUTION VALVES

Jose Juan Cordova, New York, N.Y.

Application November 28, 1956, Serial No. 624,913

6 Claims. (Cl. 137—625.17)

This invention relates to valves. It is particularly directed to a valve having a plurality of inlets and a plurality of outlets, and provided with means for directing fluid from either one or more of the inlets to a selected one of the outlets at adjusted rate of flow.

An object of this invention is to provide a highly improved, strong, rugged and compact valve of the character described, which shall be relatively inexpensive to manufacture, easy to manipulate, which shall be sure and positive in operation, and practical and efficient to a high degree in use.

Another object of this invention is to provide in a highly improved valve of the character described, means which can be operated by a single handle for moving a valve member longitudinally as well rotatably to obtain the desired results.

Yet a further object of this invention is to provide a valve of the character described which shall require a minimum of machining and which shall be leak proof.

Other objects of this invention will in part be obvious and in part hereinafter pointed out.

The invention accordingly consists in the features of construction, combinations of elements, and arrangements of parts, which will be exemplified in the construction hereinafter described, and of which the scope of invention will be indicated in the appended claims.

In the accompanying drawings in which is shown various illustrative embodiments of this invention:

Fig. 1 is a longitudinal cross-sectional view of a valve embodying the invention;

Fig. 2 is a cross-sectional view taken on line 2—2 of Fig. 1;

Fig. 3 is a cross-sectional view taken on line 3—3 of Fig. 1;

Fig. 4 is a view similar to Fig. 1 but showing the valve in a longitudinally shifted position relative to the position shown in Fig. 1;

Fig. 5 is a cross-sectional view taken on line 5—5 of Fig. 4;

Fig. 6 is a cross-sectional view taken on line 6—6 of Fig. 2;

Fig. 7 is an end view of one of the outlets shown in Fig. 1;

Fig. 8 is a partial axial cross-sectional view of a valve embodying the invention and illustrating a modified construction;

Fig. 9 is a cross-sectional view taken on line 9—9 of Fig. 8;

Fig. 10 is a cross-sectional view taken on line 10—10 of Fig. 8; and

Fig. 11 is a cross-sectional view taken on line 11—11 of Fig. 9.

Referring now in detail to the drawing, 10 designates a valve embodying the invention. The same comprises a housing 12. Said housing 12 comprises a casing part 13, a casing part 14 attached thereto, and a cap part 15 attached to the casing part 14.

The casing part 13 comprises a tubular wall 17 from which extends outwardly a pair of diametrically opposed outlet nipples 18, 18a. The casing part 13 is open at one end, and closed at the opposite end by a wall 19. Said casing part is formed with a longitudinal axial cylindrical bore 20 communicating with a pair of square shaped outlet openings 21, 21a. The bore 20 is disposed on opposite sides of the outlet openings 21, 21a. The nipples 18, 18a are internally threaded with pipe threads as at 22, 22a, respectively, to receive outlet pipes 23 and 23a, respectively. Extending from bore 20 is an axial cylindrical bore 25 of increased diameter terminating short of the open end of the tubular portion 17. At the open end of said tubular portion 17 is a counterbored internally screw threaded opening 27 of greater diameter than the bore 25, thereby forming a shoulder 28 on which is seated a washer 29.

The casing part 13 is furthermore formed with a pair of diametrically opposed inlet nipples 24, 24a internally screw threaded, and is also formed with a pair of diametrically opposed inlet openings 26, 26a communicating with said nipples, respectively, and with the bore 25. The openings 26, 26a may be circular. The openings 26, 26a are located about midway between the ends of the bore 25. Screwed into the nipples 24, 24a are pipes 26b, 26c which could be hot and cold water pipes, respectively.

The casing part 14 is tubular in shape being formed with a through opening coaxial with bores 20, 25. At one end of the tubular casing part 14 is an externally screw threaded portion 30 screwed into the internally threaded portion 27 and adapted to press against the washer 29. At the screw threaded end of the tubular member 14 is an internal bore 31 of the same diameter as the internal bore 20 in the casing part 13. Extending from the bore 31 is an axial, cylindrical bore 32 of greater diameter than that of the bore 31. At the opposite end of tubular member 14 is a counterbored, internally screw threaded opening 35 of greater diameter than the bore 32. Between the bores 32 and 35 is a shoulder 36. Seated on said shoulder is a washer 37. Mounted on the washer is a tubular packing 38. Screwed within the internally threaded opening 35 is a nut 39 for pressing the packing 38 against the washer 37. The nut 39 is formed with a central opening 40.

The cap 15 comprises a cylindrical wall 43 internally screw threaded as at 44 and screwed to an externally screw threaded reduced outer end portion 45 on casing member 14. At one end of the cylindrical wall 43 is an inwardly extending annular flange 47 forming a central opening 48.

Rotatably and slidably mounted within the casing part 17 is a valve stem member 50 to which is fixed a valve stem member 51 for rotation and sliding movement therewith. Member 50 comprises a tubular portion 52 slidably and rotatably mounted within the bore 20. It is formed with an axial opening 53 extending to one end of member 50, and said end may be closed by a cap 54 of any suitable construction.

It will be noted that portion 52 is disposed on opposite sides of the outlet openings 21, 21a. Said portion 52 is formed with an external annular groove 55 receiving an O ring 56 contacting the inner surface of bore 20 between the outlet openings 21, 21a and the bore 25 for sealing said member 52 against leakage from said bore 25 to said outlet openings. Extending from the tubular portion 52 is a cylindrical portion 60 of somewhat increased diameter but of less diameter than that of the bore 25. It will be noted that between the bores 20 and 25 is formed an annular shoulder 61. The valve member 50 is formed, at cylindrical portion 60, with an annular inclined, external groove 64 receiving a sealing O ring 65 adapted to contact the shoulder 61 when the valve member has been moved fully to the right, to seal off the valve when in closed position. Extending from the cylindrical portion 60 is a cylindrical portion 67 rotatably and slidably mounted within the bore 25.

The tubular portion 52 is formed with a radial opening 70 having a diameter preferably about half the width of one of the openings 21 or 21a. The opening 70 is located at one side of the axis of the nipples 18, 18a when the valve is in the closed position thereof, as shown in Fig. 1. Said valve portion 52 is also formed with a pair of diametrically opposed through openings 71 located between the outlet openings 21, 21a, and the shoulder 61 when the valve is in closed position. In such position, the openings 71 are closed. The valve portion 67 is formed with a transverse slot 72. The bottom surface 73 of the slot 72 is on a diametric line passing through the axis of the valve.

It will be noted that slot 72 has a surface 74 which is in the plane of the shoulder 78 formed between the portions 60 and 67. Thus, water entering the slot 72 can pass into the space between the external surface of portion 60 and the internal bore 25. In the closed position of the valve, however, slot 72 does not communicate with the openings 26, 26a. It is only when the valve member is slidably moved to the left, as shown in Fig. 4, that slot 72 will come into communication with either one or both of the openings 26, 26a. Thus, the openings 26, 26a are spaced from the wall 80 of slot 72 which is opposed to the wall 74, in the closed position of the valve.

The valve portion 67 is formed at its left end with a blind opening 81. The valve portion 51 is formed at one end with a reduced stem 83 force-fitted into the opening 81 for fixing member 51 to member 50. Extending from the reduced end 83 is a cylindrical portion 84 of greater diameter, journalled in the opening 31. Said portion 84 is formed with an intermediate external annular groove 85 receiving an O ring seal 86 contacting the inner surface of bore 31. Extending from a portion 84 is an elongated reduced stem portion 88 passing through a central opening in the washer and through the central opening in the packing 38 and through the opening 40 of the nut 39. The outer end of the stem is formed with opposed, flattened surfaces 89 forming a flat bar portion 90. Portion 90 is formed with a transverse through opening 91. Extending through the opening 91 is a pivot pin 92.

Means is provided for both rotating and slidably or longitudinally shifting the valve members 50, 51. To this end there is provided a handle 93. Said handle 93 is formed with a hand engaging part 94. Extending from said part 94 is a head 95 formed with a transverse diametric curved slot or groove 97 receiving the flattened bar portion 90 of the stem 88. The head 97 is formed with openings on opposite sides of the slot 97 receiving the outer ends of the pivot pin 92. Extending from one end of the head 95 is a lug 98 engaging the inner side of the annular flange 47.

It will now be understood that when the handle 94 is pulled out, it will also shift the valves 50, 51 to the left from closed to open position. To close the valve, the handle 94 is moved in an opposite direction, or in a counterclockwise direction, looking at Fig. 1. When the handle 94 is pulled out to the position shown in Fig. 4, the handle may be rotated for rotating the valve members 50, 51.

It will be understood that the rate of flow or the quantity of flow is regulated by the distance that the valve is shifted to the left, since as the said valve is so shifted, the slot 72 progressively overlaps the openings 26 or 26a, or both, and the openings 71 progressively overlap the bore 25. When the slot 72 is in a position shown in Fig. 5, only hot water will enter from the pipe 26b through opening 26. When the valve is turned to bring slot 72 into registry with the opening 26a, cold water will pass through the valve. The slot 72 may be moved to a position where it will register partially with both openings 26 or 26a for mixing both hot and cold water. The valve may be rotated to bring the valve opening 70 in registry with the opening 21, which may go to a shower, or with the opening 21a which may go to a spigot, or to the bath tub.

It will be noted that the outlet openings 21, 21a have dimensions twice the diameter of the opening 70. This permits openings 70 to communicate with either of openings 21 or 21a to receive either hot water alone or cold water alone, or a mixture of both, and also to permit shifting of the valve from fully closed to fully open position, while maintaining the opening 70 in registry with either opening 21 or 21a.

It will be noted that when the valve is closed, the O ring 65 is firmly seated on shoulder 61 to seal off the water. The O rings 56 and 86 are of the same diameter. Pressure will be equalized between them. As soon as the valve member is shifted to the left, the O ring 65 moves off the seat 61 so that water may pass from slot 72 through the annular passage between portion 65 and surface 25 for movement through the openings 21 into the passage 53.

If desired, members 50 and 51 may be manufactured of a single piece of metal.

In Figs. 8, 9, 10 and 11 there is shown a valve 10a embodying the invention and illustrating a modified construction. In said modification, there is provided a valve casing 100 having four outlet nipples 101, 102, 103 and 104 instead of the two outlet nipples 18, 18a of valve 10. These communicate with openings 101a, 102a, 103a and 104a, respectively. Suitable pipes may be connected to all the nipples and they may go to various devices, such as shower, spigot, laundry washer, hair washer, or to any other desirable outlets.

The valve casing 100 is formed with inlet hot and cold water nipples 106 and 107, similar to the nipples 24, 24a, and with hot and cold inlet openings 106a and 107a. The casing 100 may be closed at one end by a wall 109, similar to wall 19. It is also formed with an internal bore 110 similar to the bore 20 of valve 10. It is also formed with an internal bore 111 of greater diameter than the bore 110, and similar to the bore 25 of valve 10.

Rotatably and slidably mounted within the valve casing 100 are valve members 50a, 51a attached together. Valve 51a may be identical with valve member 51. Valve member 50a, however, differs somewhat from valve member 50. Said valve member 50a comprises a tubular portion 112, similar to the tubular portion 52 and formed with a single radial opening 113, similar to the opening 70. It is formed with a through opening 115 extending entirely through the tubular portion 112. Valve member 50a has a portion 116 similar to the portion 67 and journalled in the bore 111, and formed with an internal annular opening 117 of greater diameter than that of the opening 115 and communicating therewith, thereby forming a sleeve portion 118 of reduced thickness. This sleeve 118 is formed with a pair of opposed openings 119 and 120 lying on one side of a diametric line passing through the axis of sleeve 118. It is also formed with a pair of opposed through openings 121 and 122 lying on one side of a diametric line at right angles to the first mentioned diametric line.

By rotating the valve members 50 and 51 by means of the handle, the openings 119, 120, 121 and 122 may be rotated to a position shown in Fig. 11. Openings 119 and 120 communicate with the openings 106a and 107a, respectively, to allow a mixture of hot and cold water to pass through opening 115. The water will pass through the opening 113 to the outlet 104a. By slightly rotating the valve, either hot or cold water, or wholly hot water may be caused to pass to the opening 104a. If the valve is rotated through an angle of about 180°, wholly cold water or wholly hot water, or a mixture of both may be caused to be passed through the outlet opening 102a. By rotating the valve through an angle of about 90° from the position shown in Fig. 11, in one direction, the valve may be caused to pass hot or cold water, or a mixture of both to the opening 101a, and by rotating said valve through an angle of about 90° in an opposite direction, hot or cold water, or a mixture thereof may be caused to pass to the outlet opening 103a. By shifting the valve longitudinally, the quantity of water passing to the outlets may be regulated, because in such case the overlap of the openings 119, 120, 121 or 122 with respect to the openings 106a, and 107a, may be adjusted.

It will be noted that valve stem portion 112 is formed with an external groove 130 receiving a sealing O ring 131 similar to the annular groove 55 and O ring 56 of valve 10. In valve 50a, it is not necessary to have the reduced portion 60, but said valve is formed with an annular inclined groove 135 receiving a sealing O ring 136, similar to the annular groove 64 and O ring 65 of valve 10.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention I claim as new and desire to secure by Letters Patent:

1. A valve comprising a valve casing provided with a pair of angularly spaced outlets and a pair of angularly spaced inlets longitudinally spaced and angularly spaced from said outlets, a valve member longitudinally and rotatably mounted within said valve casing, said valve casing being formed with a bore communicating with the outlet openings and a bore of greater diameter than the first bore communicating with the inlet openings and with a shoulder between said two bores, said valve member being provided with a portion journalled in the first bore and a portion journalled in the second bore, said valve member being formed with an annular groove, a sealing O ring within said groove adapted to be seated on said shoulder in one longitudinal position of the valve member relative to said casing, and said valve member being provided with passage means interconnecting one or both of the inlets with one or the other of said outlets when said valve member is moved to a position where said O ring is spaced from said shoulder, said valve member having means to close said inlet openings when said valve member is in position where said O ring is seated on said shoulder, said valve casing having a third bore of the same diameter as the first bore, said second bore being located between said first and third bores, said valve member having a third portion journalled in the third bore, said first and third portions of the valve member being formed with annular grooves and O rings within said annular grooves engaging the inner surfaces of said first and third bores, respectively, said valve member having a stem and said casing having a packing through which said stem passes.

2. The combination of claim 1, said passage means including an opening in said first valve portion adapted to communicate with one or the other of said outlets in each of various longitudinal and rotational positions of said valve member within said casing.

3. In combination, a valve casing having a pair of diametrically opposed outlet openings, and a pair of diametrically opposed inlet openings longitudinally and angularly spaced with respect to said outlet openings, said valve casing being formed with an axial bore communicating with said outlet openings, and with an axial bore of greater diameter communicating with said inlet openings, a valve member having a portion within the first bore, and a portion within the second bore and being rotatably and longitudinally mounted within said casing, said first portion having an axial opening, means to close one end of said axial opening, said first portion being formed with a radial opening extending from said axial opening and adapted to communicate with one or the other of said outlet openings, said first portion being formed with a pair of diametrically opposed openings communicating with said axial opening, and being spaced from the first radial opening, said valve casing being formed with a shoulder between the first and second axial bores, said valve member being formed with a portion between the first and second portions thereof and having a diameter less than the diameter of the second portion and being formed with an inclined annular groove and with a sealing O ring within said groove adapted to be seated on said shoulder when the valve member is moved in one direction to prevent passage of water from the inlet to the outlet openings, and said second portion of the valve member being formed with a transverse slot located on one side of a diametrical line passing through the axis of said valve member and communicating with the space formed between the second bore and said portion of the valve member between the first and second portions thereof, said slot being offset from the inlet openings when the valve member is moved to a position where said O ring is seated on said shoulder, said first and second radial openings being located within the first bore when said valve is in position with said O ring seated on said shoulder, said first portion being formed with an annular external groove located between the first and second radial openings, with an O ring therein contacting the inner surface of the first bore and said valve casing having a bore of a diameter similar to the diameter of the first bore and located beyond the second bore, and said valve member having a portion journalled within said third bore, and formed with an external annular groove, with an O ring therein contacting the inner surface of said third bore.

4. The combination of claim 3, said outlet openings being substantially twice the dimension of the first annular opening both longitudinally and annularly.

5. The combination of claim 4, the width of said transverse slot being substantially equal to the width of said inlet openings.

6. The combination of claim 5, and said inlet openings being substantially of the same dimension as said first radial opening.

References Cited in the file of this patent

UNITED STATES PATENTS

| 1,693,758 | Hennessey | Dec. 4, 1928 |
| 2,660,834 | MacGlashan | Dec. 1, 1953 |
| 2,684,691 | Strickler | July 27, 1954 |
| 2,698,120 | Fairchild | Dec. 28, 1954 |
| 2,800,923 | Russell | July 30, 1957 |
| 2,847,027 | Kumpman | Aug. 12, 1958 |
| 2,862,520 | Cordova | Dec. 2, 1958 |